United States Patent
Dahl et al.

(10) Patent No.: US 11,557,914 B2
(45) Date of Patent: Jan. 17, 2023

(54) BATTERY DRIVEN GROUND POWER UNIT WITH IMPROVED CONSTRUCTION, OPERABILITY, DURABILITY AND MAINTENANCE

(71) Applicant: ILLINOIS TOOL WORKS INC., Glenview, IL (US)

(72) Inventors: Søren R. Dahl, Rudkøbing (DK); Bo Vork Nielsen, Faaborg (DK); Morgens Preuss Svendsen, Odense Sø (DK)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/282,967

(22) PCT Filed: Mar. 22, 2019

(86) PCT No.: PCT/US2019/023542
§ 371 (c)(1),
(2) Date: Apr. 5, 2021

(87) PCT Pub. No.: WO2020/072094
PCT Pub. Date: Apr. 9, 2020

(65) Prior Publication Data
US 2021/0376651 A1    Dec. 2, 2021

Related U.S. Application Data

(63) Continuation of application No. PCT/US2018/054668, filed on Oct. 5, 2018, and a
(Continued)

(30) Foreign Application Priority Data

Oct. 7, 2017   (EP) ..................................... 17195353
Oct. 5, 2018   (WO) ................ PCT/US2018/054668

(51) Int. Cl.
*H02J 7/34*      (2006.01)
*B64F 1/36*      (2017.01)
*H02J 7/00*      (2006.01)

(52) U.S. Cl.
CPC ................ *H02J 7/34* (2013.01); *B64F 1/364* (2013.01); *H02J 7/0024* (2013.01);
(Continued)

(58) Field of Classification Search
CPC ........ H02J 7/34; H02J 7/00038; H02J 7/0024; H02J 7/0031; H02J 7/0045; H02J 7/0047; H02J 7/0063; B64F 1/364
See application file for complete search history.

(56) References Cited

U.S. PATENT DOCUMENTS

| | | | |
|---|---|---|---|
| 8,994,213 B1 * | 3/2015 | Czamara ................. | H02J 9/062 307/64 |
| 2006/0157987 A1 * | 7/2006 | Albrecht ................. | H02J 9/062 290/1 A |

(Continued)

FOREIGN PATENT DOCUMENTS

| | | |
|---|---|---|
| EP | 2 712 045 A2 | 3/2014 |
| EP | 3 065 260 A1 | 9/2016 |

OTHER PUBLICATIONS

Aradex AG, "Referenzbericht: eGPU Energie-versorgung von Flugzeugen," Oct. 2016, A/N 20161028_POS_00242_DE, 2 pages, Lorch, Germany.
(Continued)

*Primary Examiner* — Carlos Amaya
(74) *Attorney, Agent, or Firm* — Pauley Erickson & Swanson

(57) ABSTRACT

An airport ground power unit for supplying electric current to an aircraft parked on the ground, a method of operating the ground power unit, a system for supplying electric
(Continued)

current to an aircraft parked on the ground, a method of operating such system, and a Y-adaptor.

14 Claims, 9 Drawing Sheets

Related U.S. Application Data continuation-in-part of application No. 16/649,066, filed as application No. PCT/US2018/054668 on Oct. 5, 2018.

(52) U.S. Cl.
CPC ........ *H02J 7/0031* (2013.01); *H02J 7/00038* (2020.01); *H02J 7/0045* (2013.01); *H02J 7/0047* (2013.01); *H02J 7/0063* (2013.01)

(56) References Cited

U.S. PATENT DOCUMENTS

| | | | |
|---|---|---|---|
| 2011/0221279 A1* | 9/2011 | Ratnaparkhi | H02M 5/4585 307/151 |
| 2014/0210399 A1 | 7/2014 | Urschel et al. | |
| 2017/0302888 A1* | 10/2017 | Mehrholz | B64F 1/36 |

OTHER PUBLICATIONS

EPO (Riswijk, NL) English language version of the International Search Report Form PCT/ISA/210, for International Application PCT/US2019/023542, dated May 23, 2019 (04 pages).

EPO (Munich, GE), English language version of the Written Opinion of the International Searching Authority, Form PCT/ISA/237, for International Application PCT/US2019/023542, dated May 23, 2019 (09 pages).

EPO, Communication pursuant to Article 94(3) EPC, Form 2001 11.16AUWF, dated Feb. 18, 2022 (5 pages).

* cited by examiner

BATTERY DRIVEN GROUND POWER UNIT WITH IMPROVED CONSTRUCTION, OPERABILITY, DURABILITY AND MAINTENANCE

CROSS REFERENCE TO RELATED APPLICATION

This application is a National Phase filing in the United States, under 35 USC § 371, of PCT International Patent Application PCT/US2019/023542, filed on 22 Mar. 2019 which claims the priority of PCT International Patent Application PCT/US/2018/054668, filed 5 Oct. 2018; which claims the priority of European Patent Application EP 17195353.2, filed 7 Oct. 2017.

This application is also a continuation-in-part of U.S. patent application Ser. No. 16/649,066, filed 19 Mar. 2020, which is a 371 filing of PCT/US2018/054668, filed 5 Oct. 2018; which claims the priority of European Patent Application EP 17195353.2, filed 7 Oct. 2017.

These co-pending applications are hereby incorporated by reference herein in their entirety and is made a part hereof, including but not limited to those portions which specifically appear hereinafter.

BACKGROUND OF THE INVENTION

Field of the Invention

This invention relates to systems for supplying electric current to an aircraft parked on the ground, comprising a battery aircraft ground power unit (GPU).

Discussion of Related Art

In the related art "Referenzbericht: eGPU Energieversorgung von Flugzeugen" by ARADEX AG, CH, a battery driven ground power unit is presented.

The inventors wanted to improve construction, operability, durability and maintenance of such battery driven GPU. The object of the invention therefore was to provide a GPU with improved construction, operability, durability and/or maintenance.

In this application the term battery GPU generally relates to a GPU comprising one or more batteries. It may in addition be a hybrid GPU, containing in addition a combustion engine and generator.

SUMMARY OF THE INVENTION

The object of improving operability of a battery GPU is achieved by a system for supplying electric current to an aircraft parked on the ground, comprising a battery GPU for supplying electric current to an aircraft parked on the ground, preferably according to any of the herein described battery GPU embodiments, the battery GPU comprising one or more batteries, and an inverter for transforming an output current of the one or more batteries to an alternating output current of the inverter to be supplied to the aircraft, wherein the battery GPU comprises an alternating current input port, wherein the battery GPU is configured to be connected to an alternating current output connector of a helper GPU via the alternating current input port, in order to route an alternating output current of the helper GPU via the alternating current input port to the aircraft.

It is also achieved by a method of operating a system for supplying electric current to an aircraft parked on the ground, preferably a system according to the invention, comprising a battery GPU for supplying electric current to an aircraft parked on the ground, preferably according to any of the herein described battery GPU embodiments, by using one or more batteries, preferably using a GPU operation method according to any of the herein described GPU operation methods, and the system further comprising at helper GPU for supplying electric current to an aircraft parked on the ground, wherein the method comprises the steps:

connecting a helper GPU's alternating current output connector to an alternating current input port of the battery GPU, and routing an alternating output current of the helper GPU to the aircraft via the alternating current input port.

Hereby, duration of continuous use of a battery GPU can be extended by performing a handover of aircraft power supply from the battery or batteries of the battery GPU to the respective power source (e.g., battery or generator) of the helper GPU.

In a further preferred system according to the present invention, the alternating current input port comprises an aircraft socket, being configured to be connected to an aircraft output connector adapted to be connected to the aircraft.

Hereby the GPUs can be connected to each other with the existing GPU aircraft output connector. Conventional (e.g., Diesel) GPUs can be easily used as helper GPU.

The aircraft socket is a socket of the type that is integrated in the body of an airplane, to which the GPU's aircraft output connector is connected for powering the aircraft. It is standardized (6 pole, 400 Hz) and known to the one skilled in the art.

The aircraft socket is preferably embedded in the housing of the GPU. Alternatively, the output cable of the GPU features the aircraft socket by way of a Y-cable configuration.

In a further preferred system according to the present invention, the battery GPU comprises a Y-adaptor which has two alternating current input ports each comprising an aircraft socket, and which has an aircraft output connector, whereby an aircraft output connector of the battery GPU is connected to one of the two alternating current input ports. Preferably the Y-adaptor comprises the input coupling switch for each phase to be switched (e.g., 4 phases).

Hereby a battery GPU can be easily equipped with an alternating current input port.

In a further preferred system according to the present invention, the system is configured to synchronize to each other the alternating output current of the inverter of the battery GPU, preferably a phase angle and/or a frequency and/or a amplitude of the output, and the alternating output current of the helper GPU, preferably a phase angle and/or a frequency and/or a amplitude of the output.

Hereby, smooth handover of power delivery between the GPUs can be prepared. It is preferred to synchronize phase angle and frequency and amplitude. However, in practice the parameter having the highest impact on a smooth transfer might be the phase angle as amplitude and frequency might be controlled by each GPU to a sufficiently exact degree, while the phase angle between the currents of the two GPU is initially uncorrelated. Therefore, synchronizing only the phase angle of the output currents might already be enough for a smooth handover.

In a further preferred system according to the present invention, the system, preferably the battery GPU, comprises an input coupling switch, and whereby the system, preferably battery GPU, is configured to detect a parameter (e.g., the phase angle or frequency or amplitude—preferably phase angle) of the alternating output current of the helper GPU and to close the input coupling switch, if the difference between the detected parameter and a respective parameter of the alternating output current of the inverter of the battery GPU is smaller or equal to a predetermined threshold.

Hereby, smooth handover of power delivery between the GPUs is achieved. The step of detecting may be performed as part of the synchronization.

In a further preferred system according to the present invention, the system, preferably the battery GPU, is configured to shift a parameter (e.g., the phase angle or frequency or amplitude—preferably phase angle) of the alternating output current of the inverter of the battery GPU and/or, for example via a communication channel to the helper GPU's controller or inverter, to shift a parameter (e.g., the phase angle or frequency or amplitude—preferably phase angle) of the alternating output current of the helper GPU.

Hereby, the synchronization of the GPUs' output currents can be accelerated by actively shifting one or more parameters of the output currents.

In a further preferred system according to the present invention, the system, preferably the battery GPU, comprises an output decoupling switch, and whereby the system, preferably the battery GPU, is configured to open the output decoupling switch, if the input coupling switch has been switched to closed state.

Hereby, the battery GPU's inverter is disconnected or deactivated such that correct power delivery avoiding unbalanced power draw from the battery GPU and the helper GPU is achieved. Preferably, the output decoupling switch is switched within seconds or milliseconds after the input coupling switch has been switched to closed state. Preferably, the decoupling switch can be one of the switches of the inverter for deactivating the inverter.

In a further preferred system according to the present invention, the system further comprises the helper GPU, whereby the battery GPU and the helper GPU are connected to each other via the alternating current input port at the battery GPU and the alternating current output connector of the helper GPU.

In a further preferred system according to the present invention, for transforming the output current of the one or more batteries to the alternating output current of the inverter, the one or more batteries are connected to an input port of the inverter, and the system is configured to route the alternating output current of the helper ground power unit from the alternating current input port via the input port of the inverter to the aircraft, whereby the system comprises an input converter which is configured to convert the alternating output current of the helper ground power unit at the alternating current input port to a directed current and to output the directed current to the input port of the inverter.

Hereby, it is possible to feed the electric power of the helper CPU into the DC-bus of the battery GPU. The advantage of this topology is that as no-break-power-transfer can be achieved without synchronization or timed switching of the helper GPU; it however requires the input converter as an additional component. It is possible to start the helper GPU at any time as the helper GPU first takes over the power when the DC-voltage out of the batteries goes below the output voltage of the input converter. Hence, the helper GPU just takes over the load when connected and the battery voltage gets below the rectifier voltage. Additionally, the batteries will take over the load again in case the helper GPU fails and stops delivering power to the inverter. Preferably, the input converter is configured to provide a converted output voltage of approximately 15% to 25%, more preferred 20%, of the maximum battery charge and/or approximately 325V dc.

In a further preferred system according to the present invention, the input converter comprises one or more of: transformer, rectifier, filter, filter diode, choke. The transformer rectifier configuration can be of any type, provided the resulting ripple voltage is below a certain predetermined level.

In a further preferred method according to the present invention regarding operating a system, the connecting further comprises one or more of the following steps a)-c);

a) synchronizing to each other, preferably by shifting a parameter (e.g., phase angle, frequency, amplitude) of the alternating output current of the inverter of the battery GPU and/or, for example via a communication channel to the helper GPU's controller, by shifting a parameter (e.g., phase angle, frequency, amplitude) of the alternating output current of the helper GPU:

the alternating output current of the inverter of the battery GPU, preferably a phase angle and/or a frequency and/or an amplitude of the output current, and the alternating output current of the helper GPU, preferably a phase angle and/or a frequency and/or an amplitude of the output current;

b) detecting a parameter (e.g., phase angle, frequency, amplitude) of the alternating output current of the helper GPU and closing an input coupling switch, if the difference between the detected parameter and a respective parameter of the alternating output current of the inverter of the battery GPU is smaller or equal to a predetermined threshold; and preferably c) opening an output decoupling switch, if the input coupling switch has been switched to closed state.

Preferably, the battery GPU is configured to perform phase angle/frequency/amplitude detection, synchronization, shifting and switching of the respective switches; and the respective hardware is preferably implemented in the battery GPU. In that way, the helper GPU can be a conventional GPU without additional intelligence for this purpose. However, the scope of the invention also covers solutions where such tasks are (all or only partially) performed by the helper GPU or shared between helper GPU and battery GPU. Helper GPU and battery GPU may therefor communicate via communication channels in order to allow for the desired operation.

In a further preferred method according to the present invention regarding operating a system, the alternating output current of the helper ground power unit is routed from the alternating current input port via an input port of the inverter to the aircraft. Hereby, the activation/deactivation of power transfer from the helper GPU can be done easier, without specific synchronization, automatically based on the power need. Preferably, the alternating output current of the helper ground power unit is thereby converted to a dc current by an input converter of the battery GPU.

The object of improving operability of a battery GPU is furthermore achieved by an Y-adaptor which has two alternating current input ports each comprising an aircraft socket, and which has an aircraft output connector.

Hereby a battery GPU can be easily equipped with an alternating current input port.

A system according to the invention preferably comprises a first embodiment of an airport battery GPU, preferably mobile on wheels, for supplying electric current to an aircraft parked on the ground, the GPU comprising;

a first electric battery, an inverter for transforming an output current of the battery to an alternating output current of the inverter to be supplied to the aircraft, one or more first electronic switches for connecting and disconnecting the first battery to and from the inverter, wherein the one or more first switches is or are connected in serial to the first battery and wherein the serially connected first battery and the one or more first switches are together connected to the inverter, a first controller unit for controlling at least one, preferably all, of the one or more first switches;

a second electric battery and one or more second electronic switches for connecting and disconnecting the second battery to and from the inverter, wherein the one or more second switches is or are connected in serial to the second battery and wherein the serially connected second battery and the one or more second switches are together connected to the inverter such that they are in parallel to the serially connected first battery and the one or more first switches, wherein at least one, preferably all, of the one or more second switches is controlled by the first digital controller unit or by a second digital controller unit.

In addition to the one or more first switches being connected in serial to the first battery, a first diode is connected in serial, allowing current from the first battery to the inverter and blocking or limiting current from the inverter or the second battery to the first battery; and wherein in addition to the one or more second switches being connected in serial to the second battery, a second diode is connected in serial, allowing current from the second battery to the inverter and blocking or limiting current from the inverter or the first battery to the second battery.

A method of operating a system according to the invention preferably comprises a first method of operating a GPU in order to supply current to an aircraft parked on the ground the GPU comprising the steps:

by a first digital controller unit, switching one or more first electronic switches for connecting and disconnecting a first battery of the GPU to and from an inverter of the GPU, transforming an output current of the first battery to an alternating output current of the inverter, by the first controller unit or by a second controller unit, switching one or more second electronic switches for connecting and disconnecting a second battery of the GPU to and from the inverter, by a first diode of the GPU, allowing current from the first battery to the inverter and blocking or limiting current from the inverter or the second battery to the first battery, by a second diode of the GPU, allowing current from the second battery to the inverter and blocking or limiting current from the inverter or the first battery to the second battery, transforming an output current of the second battery to the alternating output current of the inverter.

Hereby, construction, operability, durability and maintenance of the battery GPU are improved. For example, if one battery is disconnected, for some reason, during load, the remaining battery (or batteries, see below) can remain unaffected. Fully charged batteries can be on hold as a reserve connected to the inverter during an aircraft turnaround if needed. The diodes thereby prevent reverse charging or reverse charging with unlimited current, which would be harmful to the battery and/or lead to reduced efficiency.

Preferably, in that same manner, the GPU comprises a third battery with one or more third switches and third diode and/or a fourth battery with one or more fourth switches and fourth diode and/or further batteries with one or more further switches and further diodes connected in parallel to the first and second battery and respective switches. Features that in the following are described as preferred for the first and second battery scenario, preferably also apply, in case of more than two batteries, to the third, fourth or further battery scenarios accordingly.

The first battery and second battery are preferably each configured to sustain 90 kW at the GPU's output port, loading to the airplane. Preferably, the first battery and second battery are built in the same way having the same electrical specifications. The first battery and/or second battery are preferably battery packs, each built from multiple battery cells.

The inverter is preferably configured to output 400 Hz ac, preferably 3×200 Vac (phase-to-phase) @ 400 Hz, preferably at at least 90 kVA.

The first/second diode is at least (configured for) limiting the current from the inverter or front the second/first battery to the first/second battery, e.g. by forcing any reverse current via a first/second shunt resistor, which could be a classic quasi-linear resistor or another current limiting element or current limiting circuit of elements. Particularly preferably, the first/second diode is (configured for) completely limiting the current from the inverter or from the second/first battery to the first/second battery, e.g. realized in that no reverse current permitting shunt path exists parallel to the respective diode.

Preferably, the GPU does not comprise a combustion engine driven generator set with a continuous electric power output higher than 50%, preferably 30%, of the output power rating of the GPU.

Preferably, one or more, of the first switches and the first diode are realized in one element, e.g. a transistor (preferably IGBT) or thyristor. The same is preferred for the second switches and second first diode.

Preferably, one or more of the first switches and the first diode are realized by an electronic relay (electro-mechanic or solid-state) and, if not the relay is already unidirectional, a separate, serially connected diode. The same is preferred for the second switches and second first diode. Preferably, at least one of the one or more first switches and at least one of the one or more second switches is realized as an electro-mechanic relay.

The output current of the battery could be led directly or indirectly (e.g. over a filter or another intermediate element) to the inverter.

Preferably, each battery has a battery monitoring device dedicated to it and the GPU is configured to disconnect any of the batteries by way of opening one of the first or second switches in case the battery monitoring device indicates a malfunction of the respective battery.

In a further preferred second embodiment of a GPU of a system according to the present invention, preferably based on the first GPU embodiment, the capacity of all batteries of the ground power in total is at least 80 kWh.

Hereby, the battery is able to store sufficient energy to sustain a couple of aircraft turnarounds by only battery stored energy.

In a further preferred third embodiment of a GPU of a system according to the present invention, preferably based on any of the preceding GPU embodiments, at least one of the one or more first switches and at least one of the one or more second switches are each configured to disconnect both poles of the respective battery from the inverter. In a further preferred method of operating a system according to the invention comprising a method of operating a GPU, preferably based on the first or any of the herein described GPU operation methods, both poles of the respective battery are connected to and disconnected from the inverter.

Hereby, safety of the GPU is improved. A complete disconnection of the battery from the other electrical circuits can be advantageous in emergencies.

In a further preferred fourth embodiment of a GPU of a system according to the present invention, preferably based on any of the preceding GPU embodiments, the GPU comprises a battery charger configured to charge the first battery and the second battery. In a further preferred method of operating a system according to the in comprising a method of operating a GPU, preferably based on the first or any of the herein described GPU operation methods, the first and second battery are charged by the same charger, either at the same time or alternating.

Preferably, the GPU comprises a switch, preferably a 2-pole switch,
a) for connecting and disconnecting the charger to and from the first/second battery
b) or for connecting and disconnecting the charger to and from a power source, inputting power to the charger.

Particularly, preferably in case a) this switch is one of the one or more first/second switches.

In a further preferred fifth embodiment of a GPU of a system according to the present invention, preferably based on any of the first to third GPU embodiment, the GPU comprises a first battery charger configured to charge the first battery and a second battery charger configured to charge the second battery. In a further preferred method of operating a system according to the invention comprising a method of operating a GPU, preferably based on the first or any of the herein GPU operation methods, the first battery is charged by a first battery charger of the GPU and the second battery is charged by a second battery charger of the GPU.

Hereby, fast and easy charging is achieved. By the GPU comprising one charger per battery, it is possible to charge the batteries from the 50/60 Hz mains and in addition, the batteries can be charged in a fast manner independently from each other. One charger per battery improves utilization of the total battery capacity, i.e., when charging of a battery needs to "slow down" due to a high cell voltage, charging of the remaining packs can continue unaffected.

Preferably, the first controller is configured to control the first charger and the second controller is configured to control the second charger. Preferably, the chargers are connected to one common or different connector of the GPU for connecting the charger to the grid power.

Preferably, the GPU comprises,
a) a switch, preferably 2-pole, for connecting and disconnecting the first charger to and from the first battery and a switch, preferably 2-pole, for connecting and disconnecting the second charger to and from the second battery,
b) or one or more switches for, together or separately, connecting and disconnecting the first and second charger to and from a power source, inputting power to the charger first and second charger.

Particularly, preferably in case a), the switches are ones of the one or more first/second switches.

Hence, preferably, at least one of the one or more first switches is configured to disconnect the, preferably first, charger from the first battery, and at least one of the one or more second switches is configured to disconnect the, preferably second, charger from the second battery.

In a further preferred sixth embodiment of a GPU of a system according to the present invention, preferably based on any of the fourth to fifth GPU embodiment, the GPU comprises a combustion engine driven generator set or a fuel cell with a continuous electric power output smaller or equal than 50%, preferably 30%, of the output power rating of the GPU, wherein the generator set is configured to feed the charger or the first and/or second charger and/or configured to feed power directly into the common DC-bus (i.e., the batteries' output and/or the inverter's input) via a rectifier. In a thither preferred method of operating a system according to the invention comprising a method of operating a GPU, preferably based on the first or any of the herein described GPU operation methods, the charger or the fast and/or second charger is fed by an according generator set of the GPU.

Hereby a cost efficient and compact way of charging the batteries is provided, by a very small engine or fuel cell, which would not be powerful enough to sustain an aircraft for which the GPU is rated for, but powerful enough to charge the batteries up to a certain charge status.

In a further preferred seventh embodiment of a GPU of a system according to the present invention, preferably based on any of the fourth to sixth GPU embodiment, at least one of the one or more first switches is configured to disconnect the first battery from the inverter while
connecting the charger or the first battery charger to the first battery
and/or not disconnecting the charger or the first battery charger from the first battery and wherein at least one of the one or more second switches is configured to disconnect the second battery from the inverter while;
connecting the charger or the second battery charger to the second battery
and/or not disconnecting the charger or the second battery charger from the second battery. In further preferred method of operating a system according to the invention comprising a method of operating a GPU, preferably based on the first or any of the herein described GPU operation methods, switching the at least one of the one or more first switches is disconnecting the first battery from the inverter while connecting the charger or the first battery charger to the first battery and/or not disconnecting the charger or the first battery charger from the first battery and switching the at least one of the one or more second switches is disconnecting the battery from the inverter while connecting the charger or the second battery charger to the second battery and/or not disconnecting the charger or the second battery charger from the second battery.

Hereby, it is possible to charge the batteries while they are not being discharged.

In a further preferred eighth embodiment of a GPU of a system according to the present invention, preferably based on any of the preceding GPU embodiments, the one or more second switches are controlled by the second controller unit, wherein the GPU comprises a first battery monitoring device for monitoring a correct function of the first battery, the first controller is connected to the first battery monitoring device via a first communication line for communication with the first battery monitoring device and configured to disconnect the first battery, preferably from the inverter and/or the charger, by opening at least one of the one or more first switches, as soon as the first battery monitoring device indicates a malfunction of the first battery, wherein the GPU comprises a second battery monitoring device for monitoring a correct function of the second battery, wherein the second controller is connected to the second battery monitoring device via a second communication line for communication with the second battery monitoring device and configured to disconnect the second battery, preferably from the inverter and/or the charger, by opening at least one of the one or more second switches, as soon as the second battery monitoring device indicates a malfunction of the second battery. In further preferred method of operating a system according to the invention comprising a method of operating a GPU, preferably based on the first or any of the herein described GPU operation methods, the batteries accordingly monitored and upon a malfunction the switches are accordingly switched to disconnect the respective battery.

Hereby, safety of the GPU is improved, as each battery has its own safety shut-off system.

Preferably, the first and second battery monitoring devices are battery management controllers configured to monitor one or more of the following:

voltage: total voltage, voltages of individual cells, minimum and maximum cell voltage or voltage of periodic taps;
temperature: average temperature, coolant intake temperature, coolant output temperature, or, temperatures of individual cells;
state of charge (SOC) or depth of discharge (DOD), to indicate the charge level of the battery;
state of health (SOH), a variously-defined measurement of the overall condition of the battery;
coolant flow: for air or fluid cooled batteries;
current: current in or out of the battery; and/or
insulation resistance: isolation between battery pole and housing and configured to indicate to the respective first and second controller if any of the foregoing or a value computed of one of the foregoing is out of its allowed boundaries to indicate a malfunction.

Preferably, the first communication line is galvanically isolated from the second communication line. This further improves safety.

Preferably, the first and second controller each communicate to the respective battery monitoring device via a communication bus (e.g. CAN bus).

In a further preferred ninth embodiment of a GPU of a system according to the present invention, preferably based on the eighth GPU embodiment, the GPU comprises a digital central controller, wherein the central controller is connected to a user interface, and is configured to be controlled by a user using user interface, and is connected to the first controller and to the second controller via a communication bus. In further preferred method of operating a system according to the invention comprising a method of operating a GPU, preferably based on the first GPU or any of the herein described operation methods, the GPU is accordingly used by a user and the central controller accordingly communicates with the first and second controller.

Hereby, safety is further improved as the overall control of the GPU by user is going through separate central controller, relieving the first and second controller from these tasks.

The central controller is preferably configured to send switching to the first and second controller for connecting or disconnecting and/or charging the first or second battery. The first controller and second controller are configured to receive these commands and switch the one or more first and second switches and or control the first and second chargers accordingly. Preferably, the first controller and second controller are configured to reject a command for connecting or disconnecting and/or charging the first or the second battery in case of a malfunction of the first or second battery, indicated by the first or second battery monitoring device.

The central controller is preferably configured to control the inverter.

Preferably, communication lines of the communication bus between the central controller and the first and second controller are galvanically insulated from the first and second communication lines between the first and second controller and the first and second battery monitoring device.

In a further preferred tenth embodiment of a GPU of a system according to the present invention, preferably based on any of the preceding GPU embodiments, at least one of the one or more first switches and the first battery form a first battery module housed in a first housing, and wherein at least one of the one or more second switches and the second battery from a second battery module housed in a second housing.

Hereby, construction, maintenance and safety are further improved. Such modules can be easier put into the GPU and exchanged. Further, effect of malfunctions, e.g. fire, can be limited by the housing. The housing is preferably fireproof, e.g. by being metallic. Preferably, the battery monitoring device (see above) is also part of the so formed battery module.

In a further preferred eleventh embodiment of a GPU of a system according to the present invention, preferably based on the tenth GPU embodiment, the first and second battery module each contain a soft-start device for temporarily limiting the output current of the respective first and second battery after connecting the respective first and second battery is being connected to the inverter by means of the one or more first and second switches. In a further method of operating a system according to the invention comprising a method of operating a GPU, preferably based on the first or any of the herein described GPU operation method, the output current of the respective first and second battery is accordingly limited temporarily.

In a further preferred twelfth embodiment of a GPU of a system according to the present invention, preferably based on any of the preceding GPU embodiments, the GPU, preferably each of the first and second housing, comprises a heating device configured to be automatically switched on or supplied with increased power, when the temperature falls below a predetermined temperature (e.g., −20° C.), and to be automatically switched off or supplied with decreased power again, when the temperature reaches a temperature above or equal to the predetermined temperature. In a further method of operating a system according to the invention comprising a method of operating a GPU, preferably based on the first or any of the herein described GPU operation methods, a heating element is accordingly switched/controlled.

In a further preferred thirteenth embodiment of a GPU of a system according to the present invention, preferably based on any of the preceding GPU embodiments, the GPU comprises an inductance connected serially between the inverter and the first and second battery. In a further method of operating a system according to the invention comprising a method of operating a GPU, preferably based on the first or any of the herein described GPU operation methods, current peaks to the inverter are damped by an inductance between inverter and the first and second battery.

Hereby, operability of the ground power system is further improved. A disconnected battery can be reconnected, although it has a higher voltage than the remaining packs and in that case the inductance will limit the inrush current into the inverter to an acceptable level. Some of the battery packs can be charged while others are used to sustain the load (discharged).

In a further preferred method of operating a system according to the present invention comprising a second method of operating a GPU, preferably based on the first or any of the herein described GPU operation method, the switching of one or more first electronic switches and the switching of the one or more second electronic switches comprise:

switching at least one of the one or more first electronic switches for connecting the first battery to the inverter;

switching at least one of the one or more second electronic switches for connecting the second battery to the inverter;

switching at least one of the one or more first electronic switches for disconnecting the first battery from the inverter, while continuing to transform the output current of the second battery to the alternating output current of the inverter, and then charging the first battery by a battery charger of the GPU;

after a certain time switching at least one of the one or more first electronic switches for connecting again the first battery to the inverter, in order to transform the output current of the now recharged first battery to the alternating output current of the inverter, while blocking or limiting current from the first battery to the second battery by the second diode.

In a further preferred method of operating a system according to the present invention comprising a third method of operating a GPU based on the first or any of the herein described GPU operation method, the switching of the one or more first electronic switches and the switching of the one or more second electronic switches comprise:

switching at least one of the one or more first electronic switches for connecting the first battery to the inverter;

switching at least one of the one or more second electronic switches for connecting the second battery to the inverter;

switching at least one of the one or more first electronic switches for disconnecting the first battery from the inverter, while continuing to transform the output current of the second battery to the alternating output current of the inverter, and then charging the first battery by a battery charger of the GPU;

after a certain time switching at least one of the one or more first electronic switches for connecting again the first battery to the inverter, in order to transform the output current of the now recharged first battery to the alternating output current of the inverter, while blocking or limiting current from the first battery to the first battery by the second diode.

In a further preferred method of operating a system according to the present invention comprising a fourth method of operating a GPU, preferably based on any of the first to third or any of the herein described GPU operation method, the switching of the one or more first electronic switches comprise:

switching at least one of the one or more first electronic switches for disconnecting the first battery from the inverter and/or a charger of the GPU, upon a first battery monitoring device for monitoring a correct function of the first battery indicates a malfunction of the first battery; and the switching of the one or more second electronic switches comprise switching at least one of the one or more second electronic switches for disconnecting the second battery from the in and/or a charger of the GPU, upon a second battery monitoring device for monitoring a correct function of the second battery indicates a malfunction of the second battery.

Preferably, this control scheme is implemented in the central controller.

BRIEF DESCRIPTION OF SEVERAL VIEWS OF THE DRAWINGS

Embodiments of the present invention will now be described, by way of example only, with reference to the accompanying drawings, whereby.

DETAILED DESCRIPTION OF THE INVENTION

Figure 1:
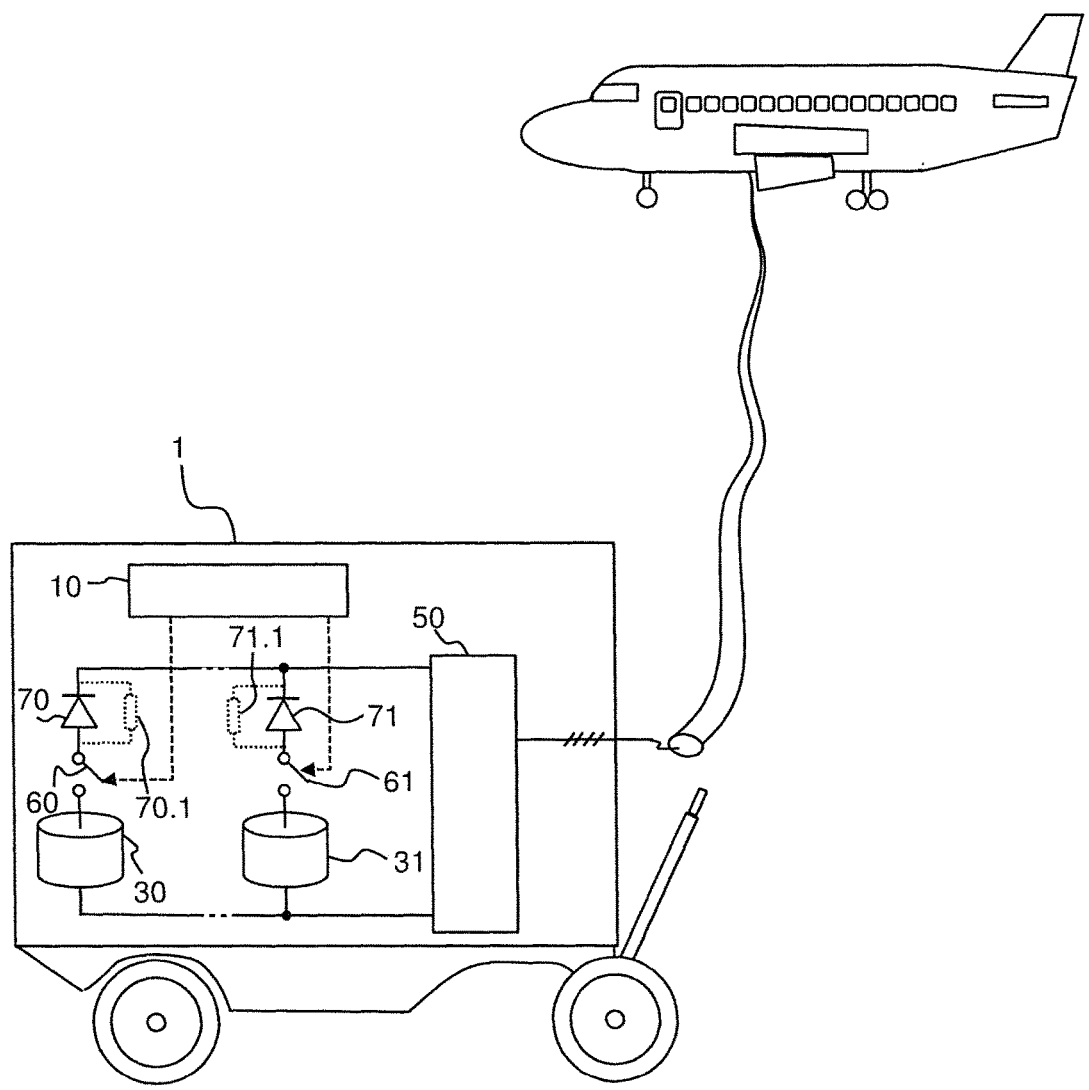
FIG. 1 is a conceptual overview of one embodiment of a GPU according to the invention.

FIG. 1 shows a conceptual overview of one embodiment of a battery GPU according to the invention. It is an airport GPU 1, here mobile on wheels, for supplying electric current to an aircraft parked on the ground.

The GPU 1 comprises:
a first electric battery 30,
an inverter 50 for transforming an output of the battery 30 to an alternating output current of the inverter 50 to be supplied to the aircraft,
one first electronic switch 60 for connecting and disconnecting the first battery 30 to and from the inverter 50, wherein the first switch 60 is connected in serial to the first battery 30 and wherein the serially connected first battery 30 and the first switch 60 are together connected to the inverter 50,
a first controller unit 10 for controlling the first switch 60.

The GPU 1 further comprises
a second electric battery 31 and
a second electronic switch 61 for connecting and disconnecting the second battery 31 to and from the inverter 50, wherein the second switch 61 is connected in serial to the second battery 31 and wherein the serially connected second battery 31 and the one second switch 61 are together connected to the inverter 50 such that they are in parallel to the serially connected first battery 30 and the first switch 60, wherein the second switch 61 is controlled by the first digital controller unit, wherein in addition to the first switch 60 being connected in serial to the first battery 30, a first diode 70 is connected in serial, allowing current from the first battery 30 to the inverter 50 and blocking (in case without the optional first shunt resistor 70.1) or limiting current from the inverter 50 or the second battery 31 to the first battery 30; and wherein in addition to the second switch 61 being connected in serial to the second battery 31, a second diode 71 is connected in serial, allowing current from the second battery 31 to the inverter 50 and blocking (in case without the optional second shunt resistor 71.1) or limiting current from the inverter 50 or the first battery 30 to the second battery 31.

Figure 2:
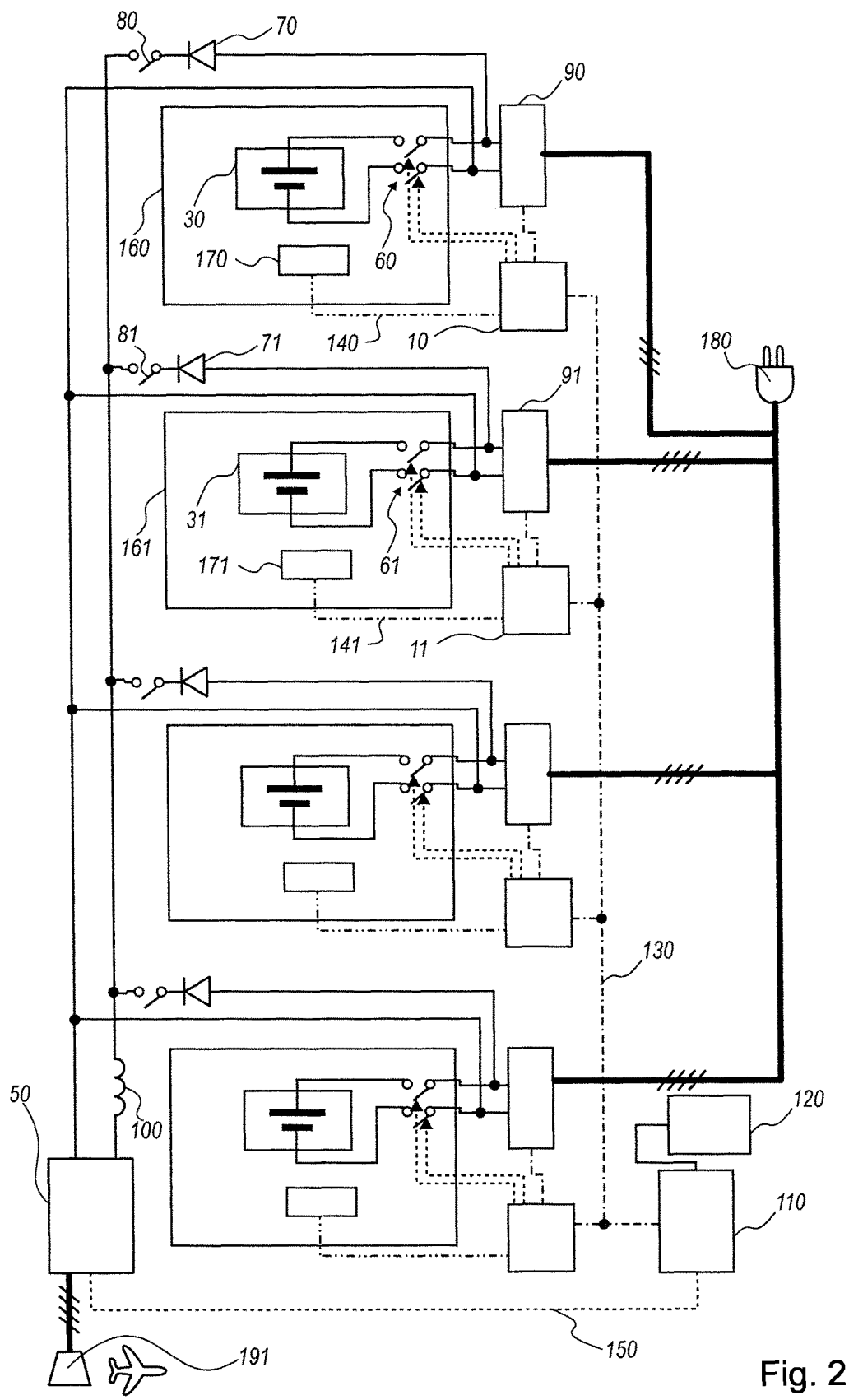
FIG. 2 is a schematic of the electrical circuit of a preferred embodiment of a GPU according to the invention.

FIG. 2 shows a schematic of the electrical circuit of a preferred embodiment of as GPU according to the invention, based on the embodiment shown in FIG. 2. In contrast to FIG. 2, there is a second digital controller unit 11 controlling the second switch 61. Furthermore, an additional first switch 80 and an additional second switch 81 are connected in serial between the respective battery 30, 31 and the inverter. The first controller 10 controls in addition switch 80 and the second controller 11 controls in addition switch 81. Further, in that same manner, the GPU 1 comprises a third battery with one or more third switches and third diode and a fourth battery with one or more fourth switches and fourth diode connected in parallel to the first and second battery and respective switches. Features that in the following are described as preferred for the first and second battery scenario, also apply (as apparent from the Figure) to the third and fourth battery scenario/portion.

The diodes are (configured for) completely limiting the current from the inverter or from any other battery than the one to which the diode connected to in serial.

The first switch and the second switch are each configured to disconnect both poles of the respective battery from the inverter.

The GPU comprises a first battery charger configured to charge the first battery and a second battery charger configured to charge the second battery. The first controller 10 is configured to control the first charger 90 and the second controller 11 is configured to control the second charger 91. The chargers 90, 91 are connected to one common connector 180 of the GPU 1 for connecting the charger to the grid power.

The additional first switch 80 is configured to disconnect the first battery 30 from the inverter 50 while not disconnecting the first battery charger 90 from the first battery 30 and the additional second switch 81 is configured to disconnect the second battery 31 from the inverter 50 while not disconnecting the second battery charger 91 from the second battery 31.

The GPU 1 comprises a first battery monitoring device 170 for monitoring a correct function of the first battery 30, wherein the first controller 10 is connected to the first battery monitoring device 170 via a first communication line 140 for communication with the first battery monitoring device 170 and configured to disconnect the first battery 30 from the inverter and the charger by opening the first switch, as soon as the first battery monitoring device 170 indicates a malfunction of the first battery 30. The GPU 1 comprises a second battery monitoring device 171 for monitoring a correct function of the second battery 31, wherein the second controller 11 is connected to the second battery monitoring device 171 via a second communication line 141 for communication with the second battery monitoring device 171 and configured to disconnect the second battery 31 from the inverter and the charger by opening the second switch 61, as soon as the second battery monitoring device 171 indicates a malfunction of the second battery 31.

The first and second controller 10, 11 each communicate to the respective battery monitoring device via a CAN bus. The first communication line 140 is galvanically isolated from the second connection 141 line.

The GPU 1 comprises a digital central controller 110, wherein the central controller 110 is connected to a user interface 120, and is configured to be controlled by a user using user interface 120, and is connected to the first controller 10 and to the second controller 11 via a communication bus 130.

The central controller 110 is configured to send switching to the first and second controller 10, 11 for connecting or disconnecting and/or charging the first or second battery 30, 31. The first controller and second controller 10, 11 are configured to receive these commands and switch the one or more first and second switches 60, 61, 80, 81 and or control the first and second chargers 90, 91 accordingly. The central controller 110 is configured to control the inverter 50. Communication lines of the communication bus 130 between the central controller 11 and the first and second controller 10, 11 are galvanically insulated from the first and second communication lines 140, 141 between the first and second controller 10, 11 and the first and second battery monitoring device 170, 171.

The first switch 60 and the first battery 30 form a first battery module 160 housed in a first housing, and the second switch 61 and the second battery 31 form a second battery module 161 housed in a second housing. The battery monitoring devices 170, 171 are also part of the respective so formed battery module 160, 161.

The GPU 1 comprises an inductance 100 connected serially between the inverter 50 and the first and second battery 30, 31.

Figure 3A:
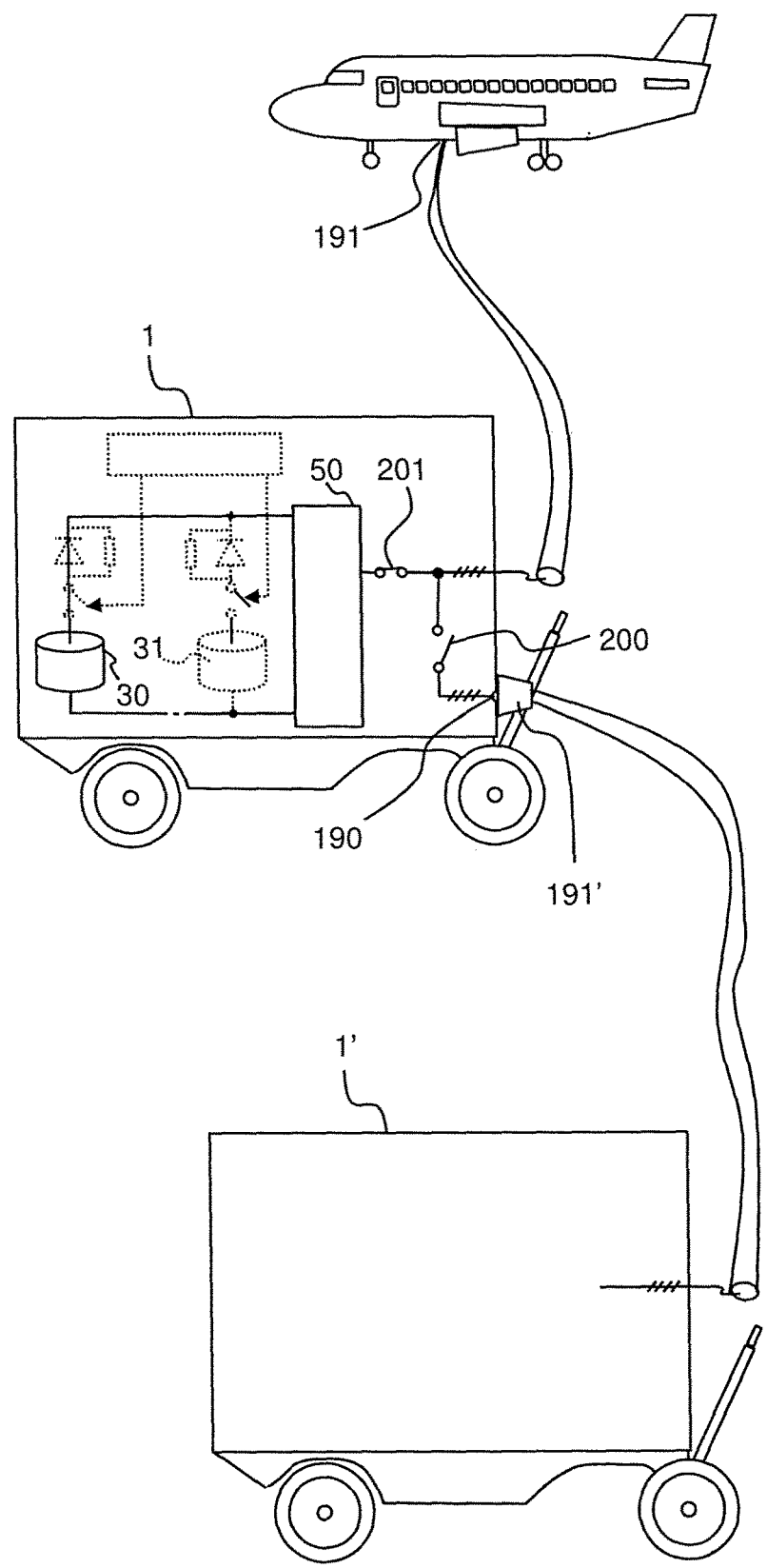
FIG. 3A shows an embodiment of a system for supplying electric current to an aircraft parked on the ground, based on the embodiment shown in FIG. 2.

FIG. 3A shows a system for supplying electric current to an aircraft parked on the ground, comprising a battery GPU 1 for supplying electric current to an aircraft parked on the ground, preferably according to one of the preceding embodiments, the battery GPU 1 comprising one or more batteries 30, 31, and an inverter 50 for transforming an output current of the one or more batteries 30, 31 to an alternating output current of the inverter 50 to be supplied to the aircraft, wherein the battery GPU 1 comprises an alternating current input port 190, wherein the battery GPU 1 is configured to be connected to an alternating current output connector 191' of a helper GPU 1' via the alternating current input port 190, in order to route an alternating output current of the helper GPU 1' via the alternating current input port 190 to the aircraft. The alternating current input port 190 comprises an aircraft socket, being configured to be connected to an aircraft output connector 191, 191' adapted to be connected to the aircraft.

The system is configured to synchronize to each other the alternating output current of the inverter 50 of the battery GPU 1 and
the alternating output current of the helper GPU 1'.

Here, the battery GPU 1 is configured to synchronize itself to the helper GPU 1' and to perform a handover of power supply from the one or more batteries 30, 31 to power delivered by helper GPU 1'.

The battery GPU 1 is configured to shift the phase angle of the alternating output current of the inverter 50. The battery GPU 1, comprises an input coupling switch 200, and the battery GPU 1 is configured:

to detect a phase angle of the alternating output current of the helper GPU 1' and
  to close the input coupling switch 200, if the difference between the detected phase angle and a phase angle of the alternating output current of the inverter 50 of the battery GPU 1 is smaller or equal to a predetermined threshold. The battery GPU 1, comprises an output decoupling switch 201 and the battery GPU 1 is configured:
to open the output decoupling switch 201 if the input coupling switch 200 has been switched to closed state. The system is operated as follows:
Connecting the helper GPU's 1' alternating current output connector 191' to the alternating current input part 190 of the battery GPU 1, and routing an alternating output current of the helper GPU 1 to the aircraft via the alternating current input port 190, while the connecting comprises:
a) synchronizing, by shifting the phase angle of the alternating output current of the inverter 50 of the battery GPU 1, to each other:
the alternating output current of the inverter 50 of the battery GPU 1, here a phase angle of the output current, and
the alternating output current of the helper GPU 1', here a phase angle of the output current;
b) detecting a phase angle of the alternating output current of the helper GPU 1' and closing the input coupling switch 200, if the difference between the detected phase angle and a phase angle of the alternating output current of the inverter 50 of the battery GPU 1 is smaller or equal to a predetermined threshold;
c) opening the output decoupling switch 201, if the input coupling switch 200 has been switched to closed state.

Figure 3B:
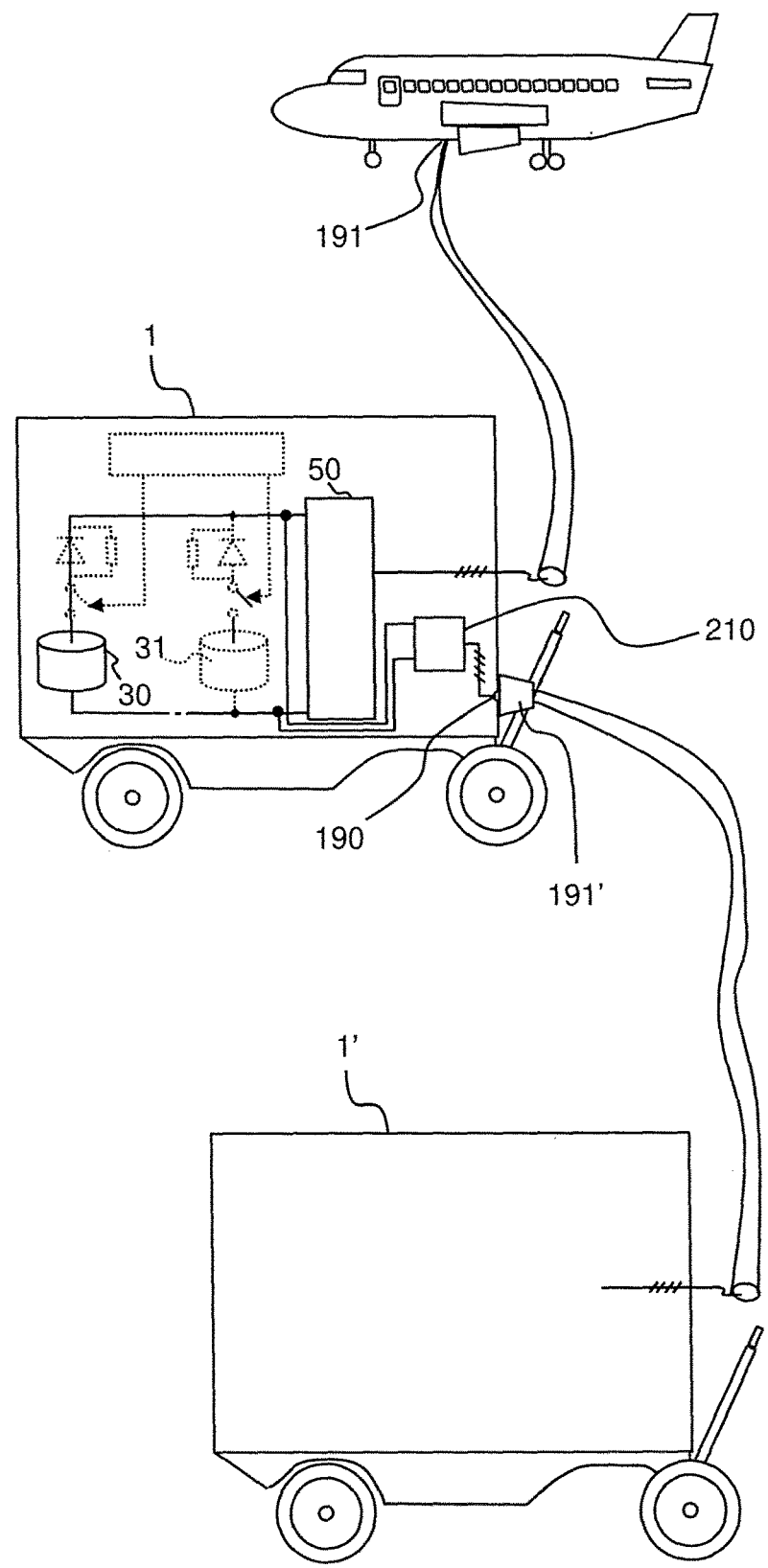
FIG. 3B shows and embodiment of a system for supplying electric current to an aircraft parked on the ground according to the invention.

FIG. 3B shows a system like the one shown in FIG. 3A. However, instead of connecting the helper GPU 1' without voltage/frequency transformation, the alternating current of the helper GPU 1' is being feed into the DC-bus of the battery GPU 1. The one or more batteries 30, 31 are connected to an input port of the inverter 50. The system is configured to route the alternating output current of the helper GPU 1' from the alternating current input port 190 via the input port of the inverter 50 to the aircraft. The system comprises an input converter 210 which is configured to convert the alternating output current of the helper GPU 1' at the alternating current input port 190 to a directed current and to output the directed current to the input port of the inverter 50. Switches 200 and 201 as in FIG. 3A are not necessary.

Figure 3C:
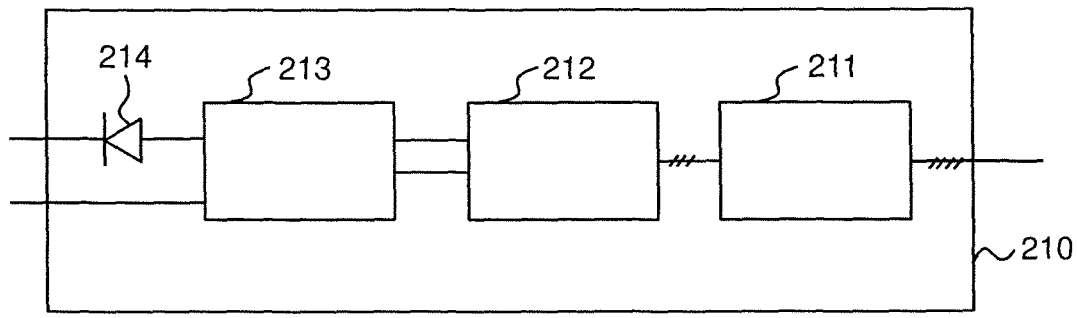
FIG. 3C shows an embodiment of an input converter for supplying electric current to an aircraft parked on the ground.
Figure 3D:
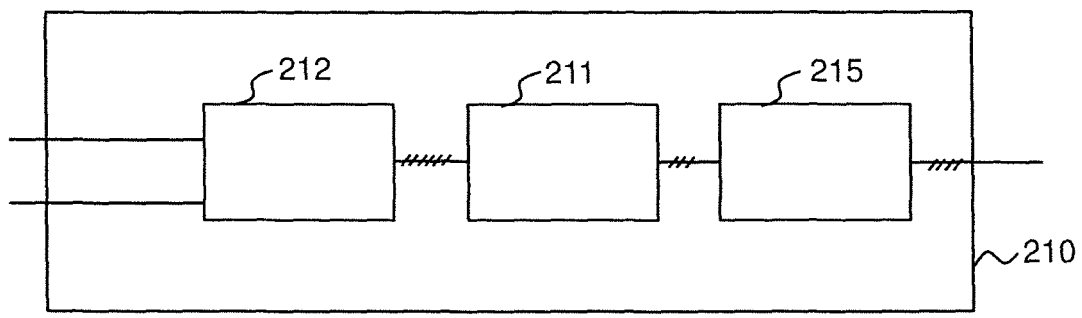
FIG. 3D shows an embodiment of an input converter for supplying electric current to an aircraft parked on the ground.

FIGS. 3C and 3D show different embodiments of the converter 210. The convener 210 in FIG. 3C comprises a transformer 211, a 6-pulse rectifier 212, a filter 213 using one or more capacitors and a filter diode 214. The filter diode 214 prevents the batteries to feed into the filter capacitors. The convener 210 in FIG. 3D comprises a choke 215, a transformer 211 and a 12-pulse rectifier 212.

Figure 4:
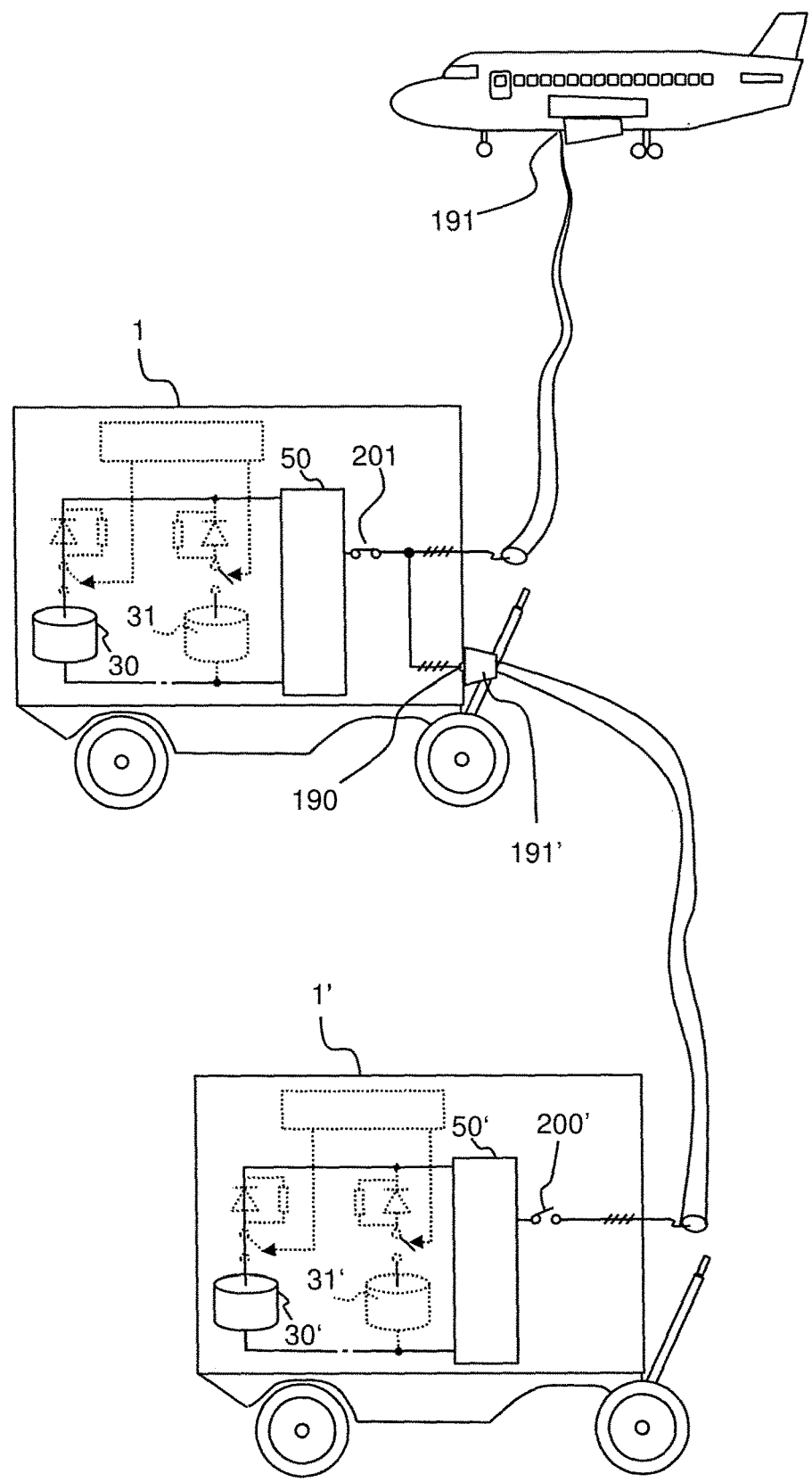
FIG. 4 shows an embodiment of a system for supplying electric current to an aircraft parked on the ground according to the invention.

FIG. 4 shows a system like the one shown in FIG. 3A whereas the input coupling switch 200' is implemented in the helper GPU 1'. Furthermore, as an example, helper GPU 1' is also a battery GPU, preferably a battery GPU with two or more batteries 30', 31' according to FIG. 1 and/or FIG. 2. In this exemplary hardware setup, one possible operation is the synchronization (by shifting the helper GPU's 1' inverter 50' phase angle) and switching of input coupling switch 200' by the helper GPU 1'. Via a communication channel to the battery GPU 1, helper GPU 1' is then switching the decoupling switch 201 to open state. Another possible operation is the synchronization and switching performed by the battery GPU 1, whereby the information about the helper GPU's 1' inverter 50' phase angle is sent via a communication channel from the helper GPU 1' to the battery GPU 1 and switch 200' is switched by battery GPU 1 via a communication channel. As in this setup, there will be live male pins (=pins under voltage) of the input port 190 during operation of the battery GPU 1 when not connected to helper GPU a mechanical protection, e.g. a protection lid, or an additional switch will need to be present for enhancing safety and avoiding users to get into contact with live male pins. The same is true for the embodiments according to FIGS. 5 and 6A, whereby in FIG. 6A, it is the input port 390.2 of the Y-adaptor 300, which may have live male pins and needs protection.

Figure 5:
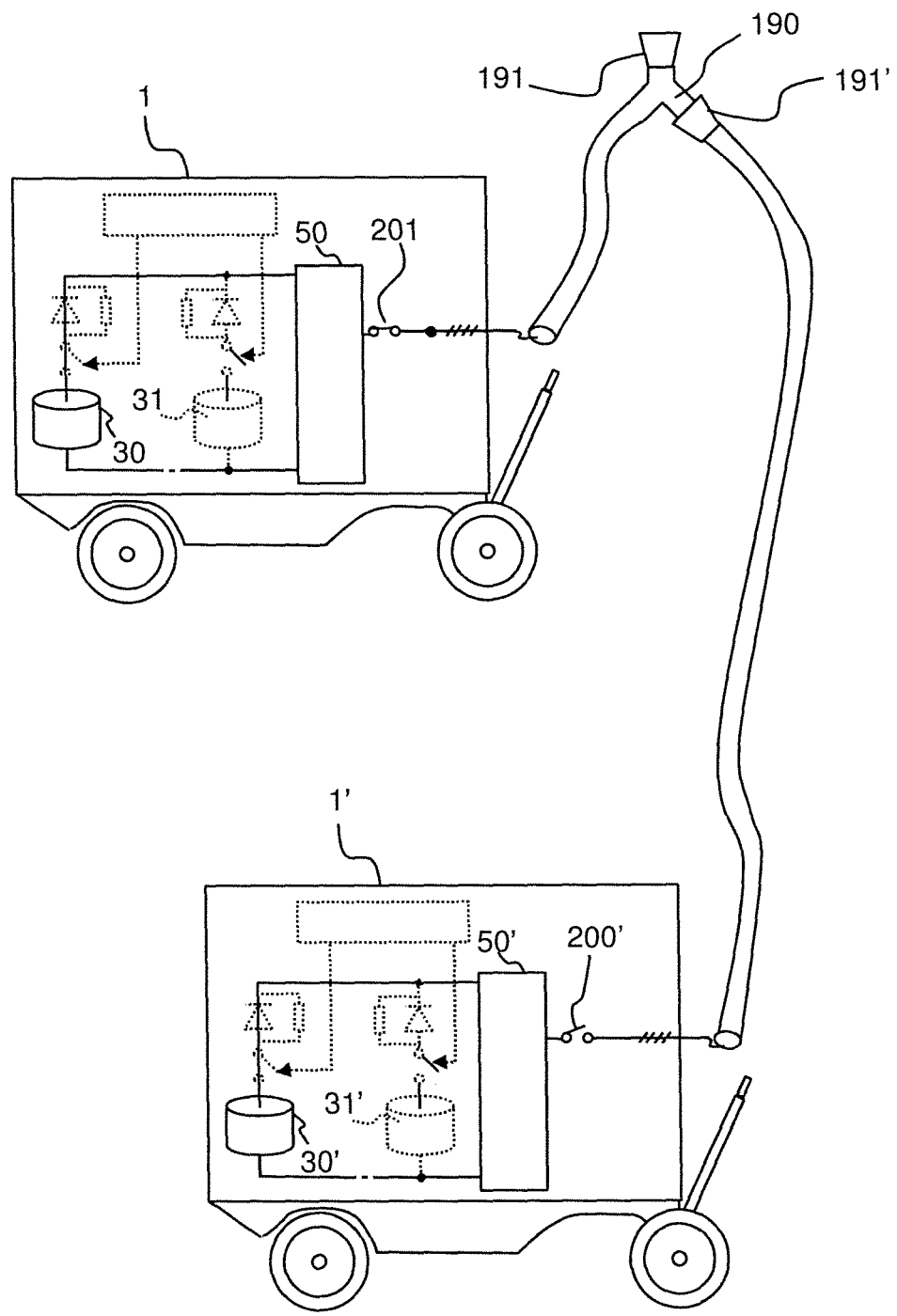
FIG. 5 shows an embodiment of a system for supplying electric current to an aircraft parked on the ground according to the invention.
Figure 6A:
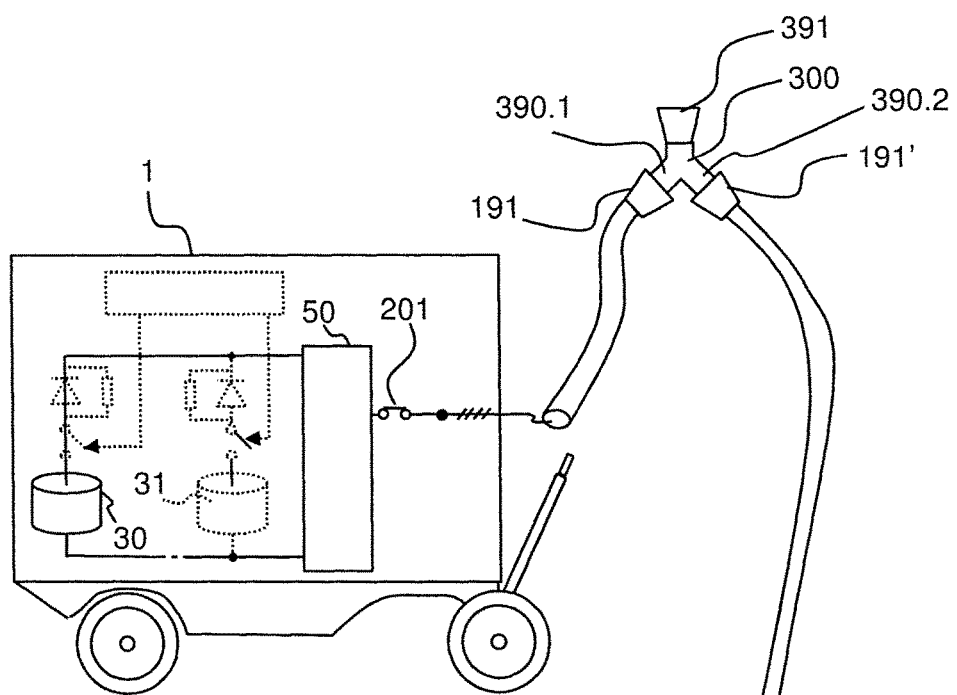
FIG. 6A shows an embodiment of a system for supplying electric current to an aircraft parked on the ground according to the invention.

FIG. 5 shows a system like the one shown in FIG. 4, whereby the output cable of the battery GPU 1 features the aircraft socket on the input port 190 by way of a Y-cable configuration.

Figure 6A:
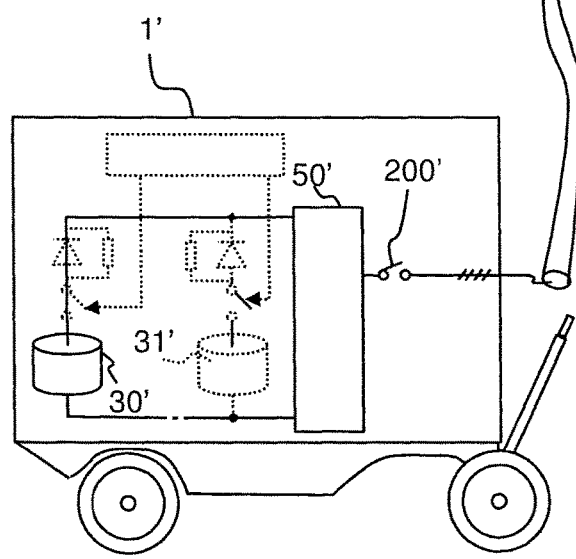
Figure 6B:
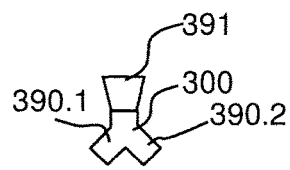
FIG. 6B shows an embodiment of a system for supplying electric current to an aircraft parked on the ground according to the invention.

FIG. 6 shows a system similar to the one shown in FIG. 5, whereby the battery GPU 1 comprises an Y-adaptor 300 which has two alternating current input ports 390.1, 390.2 each comprising an aircraft socket and which has a an aircraft output connector 391, whereby an aircraft output connector 191 of the battery GPU 1 is connected to one of the two alternating current input ports 390.1. FIG. 6B shows the Y-adaptor 300 separately.

Figure 7:
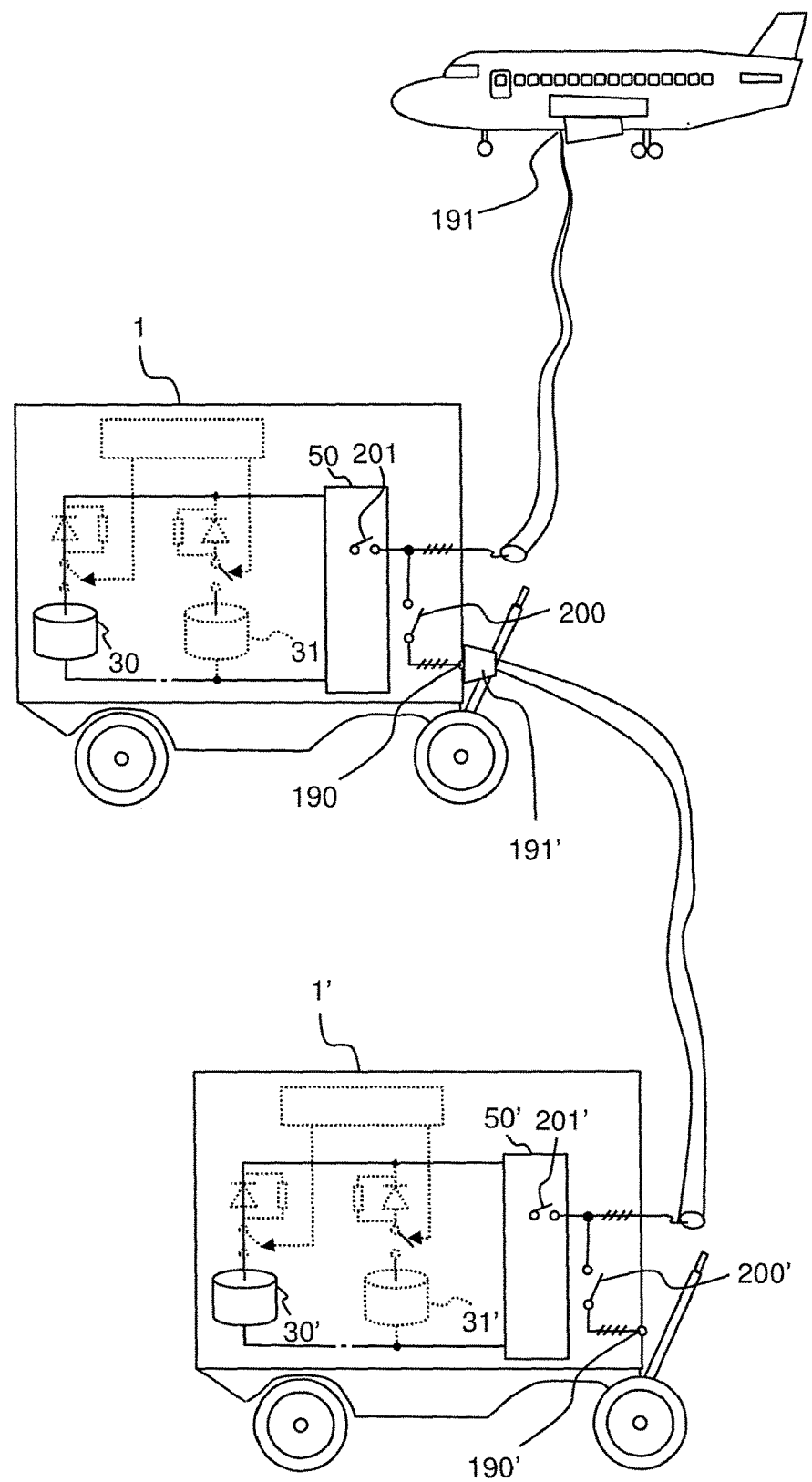
FIG. 7 shows show an embodiment of a system for supplying electric current to an aircraft parked on the ground according to the invention.

FIG. 7 shows a system like the one shown in FIGS. 3A-D, whereby two identical GPUs are used for performing a handover from one of the GPUs to the other GPU.

The invention claimed is:

1. A system for supplying electric current to an aircraft parked on the ground, comprising:
   a battery ground power unit (1) configured to supply electric current to an aircraft parked on the ground, the battery ground power unit (1) including one or more batteries (30, 31), and an inverter (50) for transforming an output current of the one or more batteries (30, 31) to an alternating output current of the inverter (50) to be supplied to the aircraft;
   an alternating current input port (190, 390.2) in combination with the battery ground power unit (1), wherein the battery ground power unit (1) is configured to be connected to an alternating current output connector (191') of a helper ground power unit (1') via the alternating current input port (190, 390.2), in order to route an alternating output current of the helper ground power unit (1') via the alternating current input port (190, 390.2) to the aircraft;
   an input coupling switch (200, 200') in combination with the battery ground power unit (1), and configured to connect between the battery ground power unit (1) and the helper ground power unit (1'); and
   an output decoupling switch (201) in combination with the battery ground power unit (1), whereby the system is configured to open the output decoupling switch (201), if the input coupling switch (200, 200') has been switched to closed state.

2. The system according to claim 1, wherein the alternating current input port (190, 390.2) comprises an aircraft socket, being configured to be connected to an aircraft output connector (191, 191') adapted to be connected to the aircraft.

3. The system according to claim 2, whereby the battery ground power unit (1) comprises an Y-adaptor (300) which has two alternating current input ports (390.1, 390.2) each comprising an aircraft socket and which has an aircraft output connector (391), whereby an aircraft output connector (191) of the battery ground power unit (1) is connected to one of the two alternating current input ports (390.1).

4. The system according to claim 1, wherein the system is configured to synchronize the alternating output current of the inverter (50) of the battery ground power unit (1) and the alternating output current of the helper ground power unit (1').

5. The system according to claim 4, whereby the system is configured:
- to detect a parameter of the alternating output current of the helper ground power unit (1'), and
- to close the input coupling switch (200, 200'), if the difference between the detected parameter and a respective parameter of the alternating output current of the inverter (50) of the battery ground power unit (1) is smaller or equal to a predetermined threshold.

6. The system according to claim 4, wherein the system is configured to shift a parameter of the alternating output current of the inverter (50) of the battery ground power unit (1) and/or to shift a parameter of the alternating output current of the helper ground power unit (1').

7. The system according to claim 1, whereby the system further comprises the helper ground power unit (1'), whereby the battery ground power unit (1) and the helper ground power unit (1') are connected to each other via the alternating current input port (190) of the battery ground power unit (1) and the alternating current output connector (191') of the helper ground power unit (1').

8. The system according to claim 7, whereby for transforming the output current of the one or more batteries (30, 31) to the alternating output current of the inverter (50), the one or more batteries (30, 31) are connected to an input port of the inverter (50), and whereby the system is configured to route the alternating output current of the helper ground power unit (1') from the alternating current input port (190) via the input port of the inverter (50) to the aircraft and wherein the system comprises an input converter (210) which is configured to convert the alternating output current of the helper ground power unit (1') at the alternating current input port (190) to a directed current and to output the directed current to the input port of the inverter (50).

9. The system according to claim 8, wherein the input converter (210) comprises one or more of transformer (211), rectifier (212), filter (213), filter diode (214), or choke (215).

10. The system according to claim 3, wherein the Y-adaptor (300) has two alternating current input ports (390.1, 390.2) each comprising an aircraft socket, and which has an aircraft output connector (391).

11. A method of operating a system for supplying electric current to an aircraft parked on the ground, the system including a battery ground power unit (1) for supplying electric current to an aircraft parked on the ground by using one or more batteries (30, 31), and the system further including a helper ground power unit (1') for supplying electric current to an aircraft parked on the ground, wherein the method comprises the steps of:
- connecting a helper ground power unit (1') via an alternating current output connector (191') to an alternating current input port (190, 390.2) of the battery ground power unit (1);
- synchronizing to each other the alternating output current of the inverter (50) of the battery ground power unit (1) and the alternating output current of the helper ground power unit (1');
- detecting a parameter of the alternating output current of the helper ground power unit (1') and closing an input coupling switch (200, 200'), if the difference between the detected parameter and a respective parameter of the alternating output current of the inverter (50) of the battery ground power unit (1) is smaller or equal to a predetermined threshold; and
- opening an output decoupling switch (201), when the input coupling switch (200, 200') has been switched to closed state; and
- routing an alternating output current of the helper ground power unit (1') to the aircraft via the alternating current input port (190, 390.2).

12. The method according to claim 11, whereby the alternating output current of the helper ground power unit (1') is routed from the alternating current input port (190) via an input port of the inverter (50) to the aircraft.

13. The system according to claim 1, further comprising a Y-adaptor (300) including the alternating current input port (390.2).

14. The system according to claim 13, wherein the Y-adaptor (300) includes a second alternating current input port (390.1) connectable to the battery ground power unit (1).

* * * * *